United States Patent [19]

Hughes et al.

[11] 3,929,758

[45] Dec. 30, 1975

[54] CYCLIZATION OF CYSTEINE-CONTAINING PEPTIDES

[75] Inventors: John Lawrence Hughes, Kankakee; Jay Kenneth Seyler, Bourbonnais; Robert Chung-Huang Liu, Kankakee, all of Ill.

[73] Assignee: Armour Pharmaceutical Company, Phoenix, Ariz.

[22] Filed: Sept. 12, 1974

[21] Appl. No.: 505,344

[52] U.S. Cl............................................ 260/112.5 R
[51] Int. Cl.²................... C07C 103/52; C08H 1/00
[58] Field of Search................................. 260/112.5

[56] References Cited
UNITED STATES PATENTS

| | | | |
|---|---|---|---|
| 3,560,521 | 2/1971 | Milkowski et al. | 260/112.5 |
| 3,679,655 | 7/1972 | Jager et al. | 260/112.5 |
| 3,749,703 | 7/1973 | Guttmann et al. | 260/112.5 |
| 3,798,203 | 3/1974 | Brugger et al. | 260/112.5 |
| 3,801,561 | 4/1974 | Guttmann et al. | 260/112.5 |
| 3,849,388 | 11/1974 | Rittel et al. | 260/112.5 |

OTHER PUBLICATIONS
Rivier: J. Am. Chem. Soc., 96, 2986–2992 (1974).

Inukai et al. Bull. Chem. Soc. Japan, 40, 2913–2918 (1967).

Wunsch et al. "Peptides 1969," E. Scoffone, ed., North Holland Pub. Co., Amsterdam, 1971, pp. 30–34.

*Primary Examiner*—Lewis Gotts
*Assistant Examiner*—Reginald J. Suyat
*Attorney, Agent, or Firm*—Richard R. Mybeck; Carl C. Batz

[57] ABSTRACT

The synthesis of a disulfide cyclic peptide by preparing a peptide containing at least two cysteine moieties in its amino acid chain one of which is protected by an n-alkylthio group, and subjecting such peptide to a procedure in which the peptide is held in solution substantially free of oxygen at a pH of from about 5 to 10 until rearrangement takes place to yield a cyclic disulfide peptide and to displace said n-alkylthio group from said amino acid chain. The disclosure also embraces said non-cyclic peptides as new compounds and the processes by which they are perpared.

38 Claims, No Drawings

CYCLIZATION OF CYSTEINE-CONTAINING PEPTIDES

This invention pertains to cyclization of peptides and more particularly to methods for treating peptides containing cysteine groups to produce a disulfide bond between such groups and so form a ring structure. Such methods are useful in the synthesis of peptides which have biological activity and which are useful in the treatment of certain diseases in animals and man.

The invention pertains also to intermediate noncyclic peptides which are precursors of cyclic disulfide peptides and to the preparation of such noncyclic peptides.

BACKGROUND

Many peptides are known which are biologically active and are useful in the treatment of diseases and which contain a disulfide ring. Calcitonins, which are useful in the treatment of Paget's disease, contain a ring structure involving cysteine groups at the 1st and 7th positions in their amino acid chains. Oxytocin is useful for the therapeutic induction or stimulation of labor in humans and animals and also to control pastpartum uterine bleeding. It contains a disulfide ring structure between the cysteine groups at positions 1 and 6 in its amino acid chain. Vasopressin and its analog lypressin are used as antidiuretic drugs in man and contain disulfide ring structures between the cysteine groups at positions 1 and 6 in their amino acid sequences (*Handbook of Biochemistry*, pages C-164 to C-188). Somatostatin, a recently discovered disulfide-containing peptide (P. Brazeau, et al, *Science*, 179, 77 [1973]), has been proposed to be of therapeutic value in the treatment of acromegaly and diabetes. Somatostatin contains a disulfide bond between the cysteine residues in positions 3 and 14 in its amino acid sequence (R. Burgus, et al, *Proc. Nat. Acad. Sci. U.S.*, 70, 684 [1973]).

Although the kind and sequence of the amino acid groups for the calcitonins, oxytocin, vasopressin, somatostatin and other such naturally occurring peptides may vary depending upon the species from which they are obtained, all such peptides which were originally obtained from natural sources, such as by extraction from the glands of humans, domestic animals, fishes, frogs, or reptiles, contain the ring structure referred to above. The amino acid sequence of some known biologically active peptides containing cysteine groups joined by disulfide bonds in a ring structure are given in Table I.

TABLE I

Typical Peptides Containing Cysteine Ring Structures

Oxytocin: H—CYS—TYR—ILE—GLN—ASN—CYS—PRO—LEU—GLY—NH₂

Vasopressin: H—CYS—TYR—PHE—GLN—ASN—CYS—PRO—ARG—GLY—NH₂

Somatostatin: H—ALA—GLY—CYS—LYS—ASN—PHE—PHE—TRP—LYS—THR—
—PHE—THR—SER—CYS\\OH

Salmon Calcitonin: H—CYS—SER—ASN—LEU—SER—THR—CYS—VAL—LEU—GLY—
—LYS—LEU—SER—GLN—GLU—LEU—HIS—LYS—LEU—GLN—THR—
—TYR—PRO—ARG—THR—ASN—THR—GLY—SER—GLY—THR—PRO—NH₂

Human Calcitonin: H—CYS—GLY—ASN—LEU—SER—THR—CYS—MET—LEU—GLY—
—THR—TYR—THR—GLN—ASP—PHE—ASN—LYS—PHE—HIS—
—THR—PHE—PRO—GLN—THR—ALA—ILE—GLY—VAL—GLY—ALA—
—PRO—NH₂

Porcine Calcitonin: H—CYS—SER—ASN—LEU—SER—THR—CYS—VAL—LEU—SER—
—ALA—TYR—TRP—ARG—ASN—LEU—ASN—ASN—PHE—HIS—ARG—
—PHE—SER—GLY—MET—GLY—PHE—GLY—PRO—GLU—THR—PRO—NH₂

Bovine Calcitonin: H—CYS—SER—ASN—LEU—SER—THR—CYS—VAL—LEU—SER—
—ALA—TYR—TRP—LYS—ASP—LEU—ASN—ASN—TYR—HIS—ARG—
—PHE—SER—GLY—MET—GLY—PHE—GLY—PRO—GLU—THR—
—PRO—NH₂

In prior attempts to prepare synthetically a peptide such as those referred to in Table I, the only method available for producing a closed disulfide ring structure was to attempt to form the non-cyclic peptide having the desired amino acid chain and then subject this peptide to an oxidative process using oxidizing agents, to form the disulfide bond between the two cysteine residues. Such oxidative methods have been described in the literature (Katsoyannis, P. G., *The Chemistry of Polypeptides*, Plenum Press, 1974, pages 60–85). A main disadvantage of these processes is the exposure of the highly labile peptide molecule to oxidizing agents. This treatment can cause inactivation of the peptide resulting in a lower yield of biologically active products.

The art has long needed a process for the formation of the disulfide bond between the cysteine moieties of a peptide that does not require the use of oxidizing agents. Accordingly we have set ourselves to the discovery of a practical and efficient method for the formation of a cyclic disulfide bond between the cysteine moieties of a peptide.

SUMMARY

We have found a method of synthesizing cyclic disulfide peptides wherein a disulfide bond between two cysteine residues in a peptide is formed by a simple procedure that does not require treatment of the peptide with oxidizing agents. This process involves the provision of a peptide in which one of the cysteine groups has bonded to it an n-alkylthio group that participates in a disulfide bond with the thiol function of the cysteine group. Such peptide may be obtained by using in the synthesis of the amino acid sequence of the peptide a different protecting group for protecting the thiol function of one of the cysteine groups, namely an n-alkylthio group, which is not removed in a subsequent cleavage step. The resulting peptide containing the n-alkylthio group attached to one cysteine moiety may be held in oxygen free solution until spontaneous rearrangement takes place completing the disulfide ring between the cysteine moieties with the displacement of the n-alkylthio protecting group.

DESCRIPTION OF INVENTION

Our improved process is applicable to the synthesis of any cyclic disulfide peptide wherein the disulfide bond is between two cysteine residues in the amino acid chain. The process is particularly advantageous in the synthesis of labile biologically active peptides because the disulfide bond formation is performed under conditions which avoid oxidation and do not otherwise disturb the peptide structure.

We may start with the preparation of a peptide and build the amino acid chain of the oxytocin, calcitonin, or any other such peptide containing two cysteine residues. The amino acid chain may be assembled by application of classical synthesis techniques or the newer solid phase techniques (Merrifield, R. B. *Advances in Enzymology* Interscience, New York, 1969, Chapter 32, 221–296 and Stuart, J. and Young, J. *Solid Phase Peptide Synthesis*, W. H. Freeman & Co., San Francisco, 1969).

We prefer to use the solid phase type of synthesis. In this synthesis the amino acids are added one at a time to the resin until the total peptide sequence has been built up on the resin. The function groups of the amino acids are protected by blocking groups. The α-amino group of the amino acids is protected by a tertiary butyloxycarbonyl group or an equivalent thereof. This α-tertiary butyloxycarbonyl group we designate as BOC. The hydroxyl functions of serine and threonine are protected by a benzyl or benzyl derivative group such as 4-methoxybenzyl, 4-methybenzyl, 3,4-dimethylbenzyl, 4-chlorobenzyl, 2,6-dichlorobenzyl, 4-nitrobenzyl, benzhydryl, or an equivalent thereof. We use the term BZ to represent benzyl or benzyl derivative groups. The hydroxyl function of tyrosine may be unprotected, may be protected by a benzyl or benzyl derivative group as described above, as a BZ group, or may be protected by a benzyloxycarbonyl or a benzyloxycarbonyl derivative such as 2-chlorobenzyloxycarbonyl or a 2-bromobenzyloxycarbonyl group or equivalent thereof. We use the term W to represent either no protective group, a BZ group, a benzyloxycarbonyl group or a benzyloxycarbonyl derivative group. The guanidino function of arginine may be protected by a nitro group, a tosyl group or an equivalent thereof. We use the character T to represent either a nitro group or a tosyl group. The ε-amino function of lysine may be protected by a benzyloxycarbonyl group or a benzyloxycarbonyl derivative such as 2-chlorobenzyloxycarbonyl, 2-bromobenzyloxycarbonyl, 3,4-dimethylbenzyloxycarbonyl or the equivalent thereof. We use the character V to represent a benzyloxycarbonyl group or a benzyloxycarbonyl derivative group. The protective groups used on the imidazole nitrogen of histine are the benzyloxycarbonyl group and benzyloxycarbonyl derivatives such as described above for lysine and are designated V. The ω-carboxylic acid groups of glutamic and aspartic acids are protected by a benzyl or benzyl derivative group such as described for the protection of the hydroxyl function of serine and threonine. These protective groups are represented by the character BZ.

The peptides to which our improved cyclizing process is applicable have at least two cysteine groups, and we may protect one or another of these groups with an n-alkylthio group while the other may be protected by a BZ group which is removed in the subsequent acid treatment along with other protective groups which may then remain. We use the character SR to represent the n-alkylthio group in which R is an alkyl group which preferably is methyl, ethyl, propyl or butyl with ethyl being usually selected as the better.

The cysteine containing the n-alkylthio protective group may be added to the amino acid chain in either of the two cysteine positions in the desired sequence while the cysteine containing the BZ protective group is added in the other cysteine position. For example, oxytocin contains cysteine residues at the 1st and 6th positions and the n-alkylthio group may be used at the 6th position while the BZ group is used at the 1st position or the BZ group may be used at the 6th position and the n-alkylthio group used at the 1st position.

According to the solid phase technology, the amino acid in the highest numbered position in the chain of the peptide to be synthesized is coupled to the resin using the protective groups as above referred to followed by removal of the BOC protective groups for the α-amino group; then the next amino acid of the next highest position is coupled to the amino acid group last added using appropriate protective groups as above set forth and the BOC protective group removed etc. until the desired chain of amino acids is completed. Suitable combinations of amino acid groups and protective groups may be obtained and these combinations reacted with the peptide previously formed to add the successive amino acid groups. Such combinations may be obtained commercially from chemical supply houses.

To illustrate the synthesis of amino acid chains occurring in peptides to which our process is applicable, we give in Tables II to VIII some typical reactants (which contain the amino acid group and protecting groups) for use in the synthesis of typical amino acid chain sequences. Each of the reactants given in Tables II to VIII may be purchased from chemical supply houses except perhaps the BOC-S-alkylthio group which may be prepared according to the method described in the art (V. Weber and P. Hartter, Hoppe-Seyler's, *Z. Physiol. Chem.* 351, 1384–8 [1970]).

TABLE II

Typical Reactants for Use in the Synthesis of Oxytocin

| Position Number | Amino Acid Reactant |
|---|---|
| 9 | BOC-glycine |
| 8 | BOC-L-leucine |
| 7 | BOC-L-proline |
| 6 | BOC-S-ethylthio-L-cysteine, BOC-S-methylthio-L-cysteine, BOC-S-n-propylthio-L-cysteine, or BOC-S-n-butylthio-L-cysteine |
| 5 | BOC-L-asparagine p-nitrophenyl ester |
| 4 | BOC-L-glutamine p-nitrophenyl ester |
| 3 | BOC-L-isoleucine |
| 2 | BOC-O-benzyl-L-tyrosine, BOC-L-tyrosine, or BOC-O-2-bromobenzyloxycarbonyl-L-tyrosine |
| 1 | BOC-S-p-methoxybenzyl-L-cysteine, BOC-S-benzyl-L-cysteine, or BOC-S-3,4-dimethylbenzyl-L-cysteine |

TABLE III

Typical Reactants for Use in the Synthesis of Salmon Calcitonin

| Position Number | Amino Acid Reactant |
|---|---|
| 32 | BOC-L-proline |
| 31 | BOC-O-benzyl-L-threonine |
| 30 | BOC-glycine |
| 29 | BOC-O-benzyl-L-serine |
| 28 | BOC-glycine |
| 27 | BOC-O-benzyl-L-threonine |
| 26 | BOC-L-asparagine p-nitrophenyl ester |
| 25 | BOC-O-benzyl-L-threonine |
| 24 | BOC-Ω-nitro-L-arginine or BOC-Ω-tosyl-L-arginine |
| 23 | BOC-L-proline |
| 22 | BOC-O-benzyl-L-tyrosine, BOC-L-tyrosine, or BOC-O-2-bromobenzyloxycarbonyl-L-tyrosine |
| 21 | BOC-O-benzyl-L-threonine |
| 20 | BOC-L-glutamine p-nitrophenyl ester |
| 19 | BOC-L-leucine |
| 18 | BOC-ε-CBZ-L-lysine or BOC-ε-2-chlorobenzyloxycarbonyl-L-lysine |
| 17 | BOC-N(im)CBZ-L-histidine |
| 16 | BOC-L-leucine |
| 15 | BOC-L-glutamic acid γ-benzyl ester |
| 14 | BOC-L-glutamine p-nitrophenyl ester |
| 13 | BOC-L-benzyl-L-serine |
| 12 | BOC-L-leucine |
| 11 | BOC-ε-CBZ-L-lysine or BOC-ε-2-chlorobenzyloxycarbonyl-L-lysine |
| 10 | BOC-glycine |
| 9 | BOC-L-leucine |
| 8 | BOC-L-valine |
| 7 | BOC-S-ethylthio-L-cysteine, BOC-S-methylthio-L-cysteine, BOC-S-n-propylthio-L-cysteine or BOC-S-n-butylthio-L-cysteine |
| 6 | BOC-O-benzyl-L-threonine |
| 5 | BOC-O-benzyl-L-serine |
| 4 | BOC-L-leucine |
| 3 | BOC-L-asparagine p-nitrophenyl ester |
| 2 | BOC-O-benzyl-L-serine |
| 1 | BOC-S-p-methoxybenzyl-L-cysteine, BOC-S-benzyl-L-cysteine or BOC-S-3,4-dimethylbenzyl-L-cysteine |

TABLE IV

Typical Reactants for Use in the Synthesis of Human Calcitonin

| Position Number | Amino Acid Reactant |
|---|---|
| 32 | BOC-L-proline |
| 31 | BOC-L-alanine |
| 30 | BOC-glycine |
| 29 | BOC-L-valine |
| 28 | BOC-glycine |
| 27 | BOC-L-isoleucine |
| 26 | BOC-L-alanine |
| 25 | BOC-O-benzyl-L-threonine |
| 24 | BOC-L-glutamine p-nitrophenyl ester |
| 23 | BOC-L-proline |
| 22 | BOC-L-phenylalanine |
| 21 | BOC-O-benzyl-L-threonine |
| 20 | BOC-N(im)-CBZ-L-histidine |
| 19 | BOC-L-phenylalanine |
| 18 | BOC-ε-CBZ-L-lysine or BOC-ε-2-chlorobenzyloxycarbonyl-L-lysine |
| 17 | BOC-L-asparagine p-nitrophenyl ester |
| 16 | BOC-L-phenylalanine |
| 15 | BOC-L-aspartic acid γ-benzyl ester |
| 14 | BOC-L-glutamine p-nitrophenyl ester |
| 13 | BOC-O-benzyl-L-threonine |
| 12 | BOC-O-benzyl-L-tyrosine, BOC-L-tyrosine, or BOC-O-2-bromobenzyloxycarbonyl-L-tyrosine |
| 11 | BOC-O-benzyl-L-tyrosine |
| 10 | BOC-glycine |
| 9 | BOC-L-leucine |
| 8 | BOC-L-methionine |
| 7 | BOC-S-ethylthio-L-cysteine, BOC-S-methylthio-L-cysteine, BOC-S-n-propyl-L-cysteine, or BOC-S-n-butylthio-L-cysteine |
| 6 | BOC-O-benzyl-L-threonine |
| 5 | BOC-O-benzyl-L-serine |
| 4 | BOC-L-leucine |
| 3 | BOC-L-asparagine p-nitrophenyl ester |
| 2 | BOC-glycine |
| 1 | BOC-S-p-methoxybenzyl-L-cysteine, BOC-S-benzyl-L-cysteine, or BOC-S-3,4-dimethylbenzyl-L-cysteine |

TABLE V

Typical Reactants for Use in the Synthesis of Vasopressin

| Position Number | Amino Acid Reactant |
|---|---|
| 9 | BOC-glycine |
| 8 | BOC-ω-tosyl-L-arginine or BOC-ω-nitro-L-arginine |
| 7 | BOC-L-proline |
| 6 | BOC-S-ethylthio-L-cysteine, BOC-S-methylthio-L-cysteine, BOC-S-n-propylthio-L-cysteine or BOC-S-n-butylthio-L-cysteine |
| 5 | BOC-L-asparagine p-nitrophenyl ester |
| 4 | BOC-L-glutamine p-nitrophenyl ester |
| 3 | BOC-L-phenylalanine |
| 2 | BOC-O-benzyl-L-tyrosine, BOC-L-tyrosine, or BOC-O-2-bromobenzyloxycarbonyl-L-tyrosine |
| 1 | BOC-S-p-methoxybenzyl-L-cysteine, BOC-S-benzyl-L-cysteine, or BOC-S-3,4-dimethylbenzyl-L-cysteine. |

TABLE VI

Typical Reactants for Use in the Synthesis of Somataostatin

| Position Number | Amino Acid Reactant |
|---|---|
| 14 | BOC-S-3,4-dimethylbenzyl-L-cysteine |
| 13 | BOC-O-benzyl-L-serine |
| 12 | BOC-O-benzyl-L-threonine |
| 11 | BOC-L-phenylalanine |
| 10 | BOC-O-benzyl-L-threonine |
| 9 | BOC-ε-CBZ-L-lysine or BOC-ε-2-chlorobenzyloxycarbonyl-L-lysine |
| 8 | BOC-L-tryptophan |
| 7 | BOC-L-phenylalnine |
| 6 | BOC-L-phenylalanine |
| 5 | BOC-L-asparagine p-nitrophenyl ester |
| 4 | BOC-ε-CBZ-L-lysine or BOC-ε-2-chlorobenzyloxycarbonyl-L-lysine |
| 3 | BOC-S-ethylthio-L-cysteine, BOC-S-methylthio-L-cysteine, BOC-S-n-propylthio-L-cysteine, or BOC-S-n-butylthio-L-cysteine |

TABLE VI-continued

Typical Reactants for Use in the Synthesis of Somataostatin

| Position Number | Amino Acid Reactant |
|---|---|
| 2 | BOC-glycine |
| 1 | BOC-L-alanine |

TABLE VII

Typical Reactants for Use in the Synthesis of Porcine Calcitonin

| Position Number | Amino Acid Reactant |
|---|---|
| 32 | BOC-L-proline |
| 31 | BOC-O-benzyl-L-threonine |
| 30 | BOC-L-glutamic acid γ-benzyl ester |
| 29 | BOC-L-proline |
| 28 | BOC-glycine |
| 27 | BOC-L-phenylalanine |
| 26 | BOC-glycine |
| 25 | BOC-L-methionine |
| 24 | BOC-glycine |
| 23 | BOC-O-benzyl-L-serine |
| 22 | BOC-L-phenylalanine |
| 21 | BOC-ω-tosyl-L-arginine or BOC-ω-nitro-L-arginine |
| 20 | BOC-N(im)-CBZ-L-histidine |
| 19 | BOC-L-phenylalanine |
| 18 | BOC-L-asparagine p-nitrophenyl ester |
| 17 | BOC-L-asparagine p-nitrophenyl ester |
| 16 | BOC-L-leucine |
| 15 | BOC-L-asparagine p-nitrophenyl ester |
| 14 | BOC-ω-tosyl-L-arginine or BOC-ω-nitro-L-arginine |
| 13 | BOC-L-tryptophan |
| 12 | BOC-O-benzyl-L-tyrosine, BOC-L-tyrosine, or BOC-2-bromobenzyloxycarbonyl-L-tyrosine |
| 11 | BOC-L-alanine |
| 10 | BOC-O-benzyl-L-threonine |
| 9 | BOC-L-leucine |
| 8 | BOC-L-valine |
| 7 | BOC-S-ethylthio-L-cysteine, BOC-S-methylthio-L-cysteine, BOC-S-n-propylthio-L-cysteine, or BOC-S-n-butylthio-L-cysteine |
| 6 | BOC-O-benzyl-L-threonine |
| 5 | BOC-O-benzyl-L-serine |
| 4 | BOC-L-leucine |
| 3 | BOC-L-asparagine p-nitrophenyl ester |
| 2 | BOC-O-benzyl-L-serine |
| 1 | BOC-S-p-methoxybenzyl-L-cysteine, BOC-S-benzyl-L-cysteine, or BOC-S-3,4-dimethylbenzyl-L-cysteine |

TABLE VIII

Typical Reactants for Use in the Synthesis of Bovine Calcitonin

| Position Number | Amino Acid Reactant |
|---|---|
| 32 | BOC-L-proline |
| 31 | BOC-O-benzyl-L-threonine |
| 30 | BOC-L-glutamic acid γ-benzyl ester |
| 29 | BOC-L-proline |
| 28 | BOC-glycine |
| 27 | BOC-L-phenylalanine |
| 26 | BOC-glycine |
| 25 | BOC-L-methionine |
| 24 | BOC-glycine |
| 23 | BOC-O-benzyl-L-serine |
| 22 | BOC-L-phenylalanine |
| 21 | BOC-ω-tosyl-L-arginine or BOC-ω-nitro-L-arginine |
| 20 | BOC-N(im)-CBZ-L-histidine |
| 19 | BOC-O-benzyl-L-tyrosine, BOC-L-tyrosine, or BOC-O-2-bromobenzyloxycarbonyl-L-tyrosine |
| 18 | BOC-L-asparagine p-nitrophenyl ester |
| 17 | BOC-L-asparagine p-nitrophenyl ester |
| 16 | BOC-L-leucine |
| 15 | BOC-L-aspartic acid γ-benzyl ester |

TABLE VIII-continued

Typical Reactants for Use in the Synthesis of Bovine Calcitonin

| Position Number | Amino Acid Reactant |
|---|---|
| 14 | BOC-ε-CBZ-L-lysine or BOC-ε-2-chlorobenzyloxycarbonyl-L-lysine |
| 13 | BOC-L-typtophan |
| 12 | BOC-O-benzyl-L-tyrosine, BOC-L-tyrosine, or BOC-O-2-bromobenzyloxycarbonyl-L-tyrosine |
| 11 | BOC-L-alanine |
| 10 | BOC-O-benzyl-L-serine |
| 9 | BOC-L-leucine |
| 8 | BOC-L-valine |
| 7 | BOC-S-ethylthio-L-cysteine, BOC-S-methylthio-L-cysteine, BOC-S-n-propylthio-L-cysteine, or BOC-S-n-butylthio-L-cysteine |
| 6 | BOC-O-benzyl-L-threonine |
| 5 | BOC-O-benzyl-L-serine |
| 4 | BOC-L-leucine |
| 3 | BOC-L-asparagine p-nitrophenyl ester |
| 2 | BOC-O-benzyl-L-serine |
| 1 | BOC-S-p-methoxybenzyl-L-cysteine, BOC-S-benzyl-L-cysteine, or BOC-S-3,4-dimethylbenzyl-L-cysteine |

In the synthesis of the peptide obtained by the reaction series of Table II and cleavage of the resin the n-alkylthio protective group was placed at the cysteine residue in the 6th position and the BZ group was placed at the first position. It should be understood that in forming this peptide these may be reversed with the BZ group being placed at the 6th position and the n-alkylthio group being placed at the 1st position. Likewise, with respect to Table III, the protective groups at the 7th and 1st positions may be reversed and the same is true as to Tables IV, VII and VIII. As to Table V, the protective groups at the 6th and 1st positions may be reversed. As to Table VI which refers to the synthesis of somatostatin, we prefer to place the n-alkylthio group at the 14th position and a BZ group at the 3rd position as set forth in this Table. Also in this synthesis, we prefer to use a chloromethylated polystyrene resin instead of the benzhydryl amine polystyrene resin which is preferred in the synthesis of the calcitonins.

The peptides containing two cysteine amino acid residues which we prepare as intermediates in our process are characterized before cleavage by their containing the following structure:

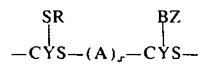

and after acid treatment to cleave protective groups, by the structure:

where
A is an amino acid residue
$x$ is zero or a whole integer
CYS is a cysteine residue
R is an n-alkyl group and
BZ is a benzyl or benzyl derivative group.

The cleaved peptide thus has one cysteine residue with a free sulfhydryl function, the other cysteine residue having its sulfhydryl function participating in a disulfide bond with an n-alkylthio group. It will be seen that the peptides produced as a result of reactions in each of Tables II to VIII may each be so characterized.

Any peptide which may be characterized as above indicated may be used as an intermediate in our process and subjected to our ring closing procedure. Any such peptide containing a structure having two cysteine residues one of which has a free sulfhydryl function and the other having its sulfhydryl function blocked by an n-alkylthio group may be held in solution (any solution in which it is soluble), with aqueous or alcoholic solutions preferred, at a pH of from about 5 to 10 until it undergoes spontaneous rearrangement to the desired cyclic disulfide cysteine peptide with the displacement of n-alkylmercaptan.

The rearrangement reaction is facilitated by adjusting the pH of the solution to from 5.0 to 8.5, preferably from 6.0 to 8.5, and best at about 7.5 as by the addition of ammonium or alkali hydroxides. A pH below 6.0 may be used but the rearrangement proceeds more slowly than is desirable, and a pH up to about 10.0 or 10.5 can be used, but when a pH higher than about 8.5 is used there is some danger of loss in yield.

Further we prefer to agitate the solution during the period of the rearrangement reaction which may take from about 2 to 48 hours but usually is complete in about 24 hours. The reaction is facilitated by stirring or other form of agitation.

Also we take care to avoid the presence of oxygen or oxygen producing substances, and keep the solution substantially free of oxygen. We prefer to place the solution containing the peptide under a stream of an inert gas such as nitrogen.

The n-alkylmercaptan which is displaced as a result of the reaction may be carried off by the nitrogen or other inert gas, and when the gas comes to be free of the mercaptan the reaction may be regarded as complete.

The intermediate peptide which contains the structure
—CYS—(A)$_x$—CYS—
in which one of said CYS groups has a free sulfhydryl function and the other of said CYS groups has bonded thereto an alkylthio group which participates in a disulfide bond with the sulfhydryl group which it protects, is by our ring closing procedure converted to a peptide in which such structure becomes

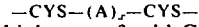

where
CYS is a cysteine residue

A is an amino acid residue and
$x$ is zero or a whole integer.

If the procedure has been carefully carried out according to the procedures and precautions above outlined, the ring closing procedure produces no other changes in the peptide other than rearrangement to form a disulfide bond between two cysteines and displace the n-alkylthio mercaptan.

The peptide solution obtained by our ring closing procedure as above set forth may be purified by procedures known to this art. The solution may be subjected to a combination of gel-filtration procedures and ion-exchange chromatography methods. The final purified product may be obtained from solution by freeze-drying. The resulting peptide will be found to be chemically and biologically equivalent to such peptide which has been obtained from natural sources.

One application of our improved process is in the synthesis of salmon calcitonin, and this is set forth in our copending application Ser. No. 496,539, filed Aug. 12, 1974, entitled "Synthesis of Salmon Calcitonin." Example I of that application may be incorporated herein as an example of the synthesis of salmon calcitonin according to our improved process. As set forth in said Example I, proline was coupled to the resin using the reactant BOC-L-proline at position 32, then threonine was coupled using the reactant BOC-O-benzyl-L-threonine at position No. 31, the coupling being continued using in sequence the reactants set forth in Table III herein. When position No. 7 was reached, a reactant containing an n-alkylthio group was used; and when position No. 1 was reached, a reactant containing a BZ group was used. Upon the completion of the desired amino acid chain, the resin peptide was treated with hydrogen fluoride to remove the resin and all of the remaining protective groups except the n-alkylthio group at position No. 7. The solution resulting from the acid cleavage step was diluted with water and adjusted to a pH of 7.5 by the addition of ammonium hydroxide. The solution was then agitated under a stream of nitrogen gas until no mercaptan was detected in the emerging nitrogen stream. Upon purification of the resulting product, it was found to be chemically and biologically equivalent to natural salmon calcitonin.

The formula of the peptide resulting from the reactions referred to in Table III, and before cleavage of the resin may be written:

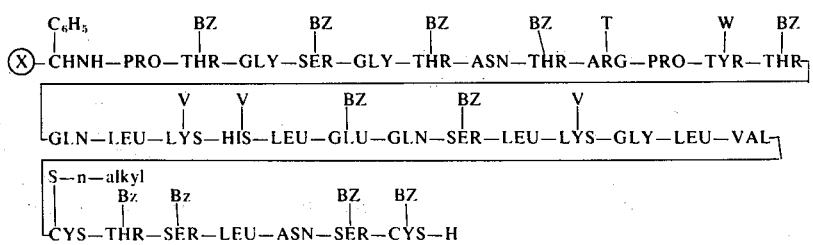

The formula of this peptide obtained upon anhydrous acid cleavage becomes:

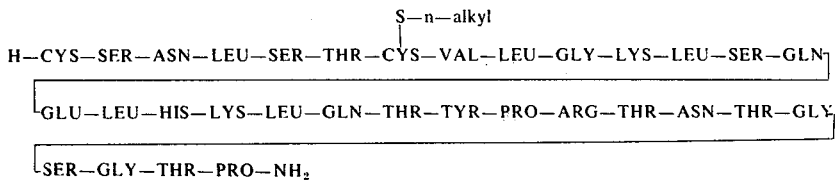

which is a precursor of salmon calcitonin.

After subjecting this peptide to our improved cyclizing method as herein described, the peptide becomes:

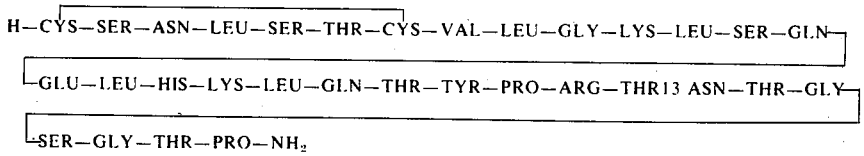

which is salmon calcitonin.

Another application of our improved process is in the synthesis of oxytocin. Oxytocin includes nine amino acids, and the amino acid chain for oxytocin may be built beginning with glycine at position 9. The glycine may be coupled to the BHA resin using the reactant BOC-glycine; then leucine may be coupled using the reactant BOC-L-leucine, and then following through using cycles of coupling and deprotection according to the solid phase technique, using in sequence the specified amino acid groups and protective groups as set forth in Table II.

When position No. 6 is reached an n-alkylthio protective group is used along with the cysteine group, and when position No. 1 is reached and another cysteine group is coupled, a BZ protective group is used. Alternatively, the BZ protective group could be used at position No. 6 and the n-alkylthio group used at position No. 1.

The peptide after completion of the amino acid chain may be written:

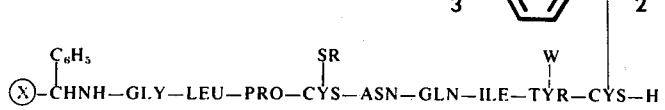

where X is the polystyrene portion of the resin

W is no protective group, a BZ group, a benzyloxycarbonyl group or a benzyloxycarbonyl derivative group and R is an n-alkyl group.

After the acid treatment to cleave the resin this becomes:

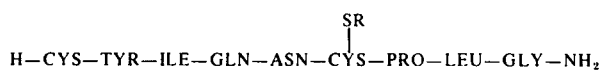

alkylthio protecting group at position 6 and the sulfhydryl function of cysteine at position 1 to yield the peptide written as follows:

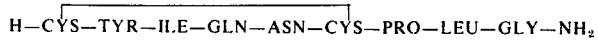

which is oxytocin.

A specific example of the synthesis of oxytocin using our improved process is given in the following Example A.

EXAMPLE A

Synthesis of Oxytocin

Resin Activation

The benzhydrylamine (BHA) resin (5 g) with an amine titer of 0.43 meq/g was placed in the reaction vessel of a peptide synthesizer marketed by Schwartz-Mann, Inc. of Orangeburg, New York. The resin was treated with 20 ml of the following solvents filtering after each treatment:
Methylene chloride - 2 minutes
Chloroform - 2 minutes two times each
10% Triethylamine in chloroform - 5 minutes two times each
Chloroform - 2 minutes
Methylene chloride - 2 minutes three times each Cycle 9

Coupling:

The BHA resin, 20 ml of methylene chloride and 0.75 g (0.0043 mole) of BOC-glycine were agitated for 10 minutes. 4.3 ml of a methylene chloride solution of dicyclohexylcarbodiimide (1 meq of DCCI per 1 ml of solution) was added to the reactor and the mixture agitated for 6 hours. The reaction mixture was removed from the reactor by filtration and the BOC-glycyl BHA resin subjected to the following successive 2 minute, 20 ml washes, removing the wash by filtration each time:
Methylene chloride - 2 times
Methyl alcohol - 2 times
Methylene chloride - 2 times Acetylation:

The resin was then agitated with a mixture of 1.6 ml of acetic anhydride, 2.4 ml of triethylamine (TEA) and 20 ml of chloroform for 30 minutes. The reaction mixture was removed by filtration and the resin subjected to the following 2 minute, 20 ml washes:
Chloroform - 2 times
Methyl alcohol - 2 times
Methylene chloride - 3 times
A negative test was found for a ninhydrin assay.

Deprotection:

The BOC-protected resin was agitated for 5 minutes with a mixture of 12 ml of trifluoroacetic acid (TFA) and 12 ml of methylene chloride. The mixture was removed by filtration and the resin was agitated with a second mixture of 12 ml of TFA and 12 ml of methylene chloride for 30 minutes. The reaction mixture was removed by filtration and the resin subjected to the following 20 ml washes:
Methylene chloride - 2 times two minutes each
Methyl alcohol - 2 times two minutes each
Chloroform - 2 times two minutes each
10% TEA in chloroform - 2 times five and 10 minutes
Chloroform - 2 times two minutes each
Methylene chloride - 2 times two minutes each.

The L-glycine BHA resin was titrated (Dorman, L., Tetrahedron Letters, 1969, 2319–21) to establish the amine or glycine titer. This value was 0.384 meq of amine or glycine per gram of resin.

Cycle 8

Coupling:

The L-glycine resin, 20 ml of methylene chloride and 2.95 g (0.0038 mole) of BOC-L-leucine.$H_2O$ were agitated for 10 minutes. Then 3.8 ml of methylene chloride solution of dicyclohexylcarbodiimide (1 meq of DCCI per 1 ml of solution or a total of 0.0038 mole of DCCI) was added to the reactor and the mixture agitated for 2 hours. The reaction mixture was removed from the reactor and the resin was subjected to the following successive 2 minute, 20 ml washes, removing the wash by filtration each time:
Methylene chloride - 2 times
Methyl alcohol - 2 times
Methylene chloride - 2 times
A ninhydrin test was negative.

Deprotection:

The deprotection procedure described in Cycle 9 was repeated for this cycle.

Cycle 7

The coupling and deprotection procedures used in this cycle were the same as in Cycle 8 except that the following amino acid derivative was used in place of the leucine derivative:
0.82 g (0.0038 mole) of BOC-L-proline

Cycle 6

The coupling and deprotection procedures used in this cycle were the same as in Cycle 8. The acetylation procedure was performed in this cycle using the same method as in Cycle 9. The following amino acid derivative was used in the coupling procedure:
1.07 g (0.0038 mole) of BOC-S-ethylthio-L-cysteine

Cycle 5

Coupling:

The peptide resin obtained from Cycle 6 was washed twice with 20 ml portions of dimethylformamide (DMF). The resin was then agitated for 24 hours with a solution of 2.01 g (0.0057 mole) of BOC-L-asparagine-p-nitrophenyl ester in 25 ml of DMF. The reaction mixture was filtered and the resin peptide subjected to two minute washes with two successive 20 ml portions of the following solvents: DMF, methylene chloride, methanol, methylene chloride. Individual solvent washes were removed by filtration. A ninhydrin test was negative.

Deprotection:

The deprotection procedure used in Cycle 8 was repeated.

Cycle 4

The coupling procedure used in this cycle was the same as in Cycle 5. The acetylation procedure was performed in this cycle using the same method as in Cycle 9. The deprotection procedure used in this cycle was the same as in Cycle 8. The following amino acid derivative was used:
2.09 g (0.0057 mole) of BOC-L-glutamine-p-nitrophenyl ester

Cycle 3

The coupling procedure used in this cycle was the same as in Cycle 8. The coupling was repeated using a solvent system of DMF 10 ml and methylene chloride 10 ml and the same amounts of amino acid and DCC. The acetylation procedure used in this cycle was the same as in Cycle 9. The deprotection procedure used in this cycle was the same as in Cycle 8. The following amino acid derivative was used for each coupling reaction:
0.88 g (0.0038 mole) of BOC-L-Isoleucine

Cycle 2

Coupling:

The resin peptide obtained from Cycle 3 was washed with two successive 20 ml portions of DMF. The resin peptide was then agitated for 10 minutes with a mixture of 2.11 g (0.0057 mole) of BOC-O-benzyl-L-tyrosine and 20 ml of DMF. Then 5.7 ml of DCCI in methylene chloride (equivalent to 0.0057 mole of DCCI) was added and the mixture agitated for 16 hours. The reaction mixture was removed by filtration. The resin peptide was subjected to 2 minute washes with two successive 20 ml portions of the following solvents: DMF, methylene chloride, methanol, methylene chloride.

The coupling was repeated using half the amounts of the amino acid derivative and DCCI in methylene chloride for an agitation time of 6 hours.

Acetylation:

Repeat acetylation procedure used in Cycle 9.

Deprotection:

Repeat deprotection procedure used in Cycle 9.

Cycle 1

The coupling procedure used in this cycle was the same as in Cycle 8. The coupling was repeated using half the amounts of the amino acid derivative and DCCI in methylene chloride. The deprotection procedure used in this cycle was the same as in Cycle 9. The following amount of amino acid derivative was used in the first coupling reaction:

1.3 g (0.0038 mole) of BOC-S-methoxybenzyl-L-cysteine

After completion of Cycle 1, the resin peptide was washed with two successive 20 ml portions of n-hexane. The peptide material was removed from the reactor and dried in an electric vacuum oven at 40°C. and 0.1 mm of Hg for 24 hours. The blocked oxytocin peptide resin weighed 6.0 g.

Cleavage with Hydrogen Fluoride

The dried resin peptide (2 g) and 2 ml of anisole were placed in a Teflon reaction vessel. The vessel equipped with a Teflon-coated magnetic stirrer was placed in a dry ice-acetone bath and 15 ml of hydrogen fluoride gas was condensed into the vessel. This mixture was stirred at 0°C. in an ice bath for 1 hour. The hydrogen fluoride was removed by evaporation at reduced pressure. The residue was triturated with 4 × 25 ml portions of ethyl acetate. The peptide was extracted from the resin beads with 2 × 50 ml portions of glacial acetic acid. The extract was lyophilized to 486 mg of cleaved peptide.

Cyclization of Peptide to Oxytocin

The crude peptide, 200 mg, was partially dissolved in 50 ml of oxygen-free distilled water with 1 ml of glacial acid added. The pH of the solution was adjusted to 7.5 by the addition of concentrated ammonium hydroxide. This mixture was stirred in a closed vessel under a stream of nitrogen for 24 hours. At this time no ethyl mercaptan could be detected in the emerging nitrogen stream. The ethyl mercaptan content of the nitrogen stream was measured by passing the stream through a solution of Ellman's reagent (Ellman, G. L., Arch. Biochem. Biophys., 82, 70-7 [1959]). Thr reaction mixture was adjusted to pH of 3.2 by addition of glacial acetic acid. It was lyophilized to give a solid residue.

Purification of the Crude Oxytocin

This solid residue was dissolved in 0.5 N acetic acid solution and purified by passing through a Sephadex G-25 (fine) gel-filtration column and eluted with 0.5 N acetic acid. The oxytocin fraction from this column was collected and lyophilized to give 54 mg of white solid.

This solid was again dissolved in 0.5 N acetic acid solution and purified by passing through the Sephadex G-25 (fine) gel-filtration column and eluted with 0.5 N acetic acid solution. The oxytocin fraction from this column was collected and lyophilized to give a fluffy white solid. This product was assayed and the following amino acid ratios found: GLY 1.0, LEU 0.98, PRO 0.97, ASP 0.89, GLU 0.84, ILE 0.74, TYR 0.72. The theoretical amount should be 1.0. The value for CYS was not reported because the assay method destroys this amino acid. The biological potency of the product was 305.4 units per mg.

Our improved process may also be applied in a similar manner to the synthesis of somatostatin. The resin may be the polystyrene resin such as the chloromethylated polystyrene resin known to the art. Cysteine, at position 14, may first be coupled to the resin using as a reactant BOC-S-3,4-dimethylbenzyl-L-cysteine, then serine, then threonine, etc. using the reactants containing the amino acids and protective groups in sequence as set out in Table VI. When position 3 is reached the cysteine group with an n-alkylthio group is used. When the amino acid chain is completed and before the acid treatment step to cleave the resin, the peptide may be written:

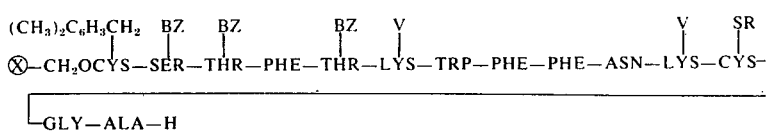

After treatment with acid to cleave the resin, the peptide becomes:

Then after the non-cyclic cleaved peptide is allowed to rearrange under the conditions of our cyclizing procedure, it may be written:

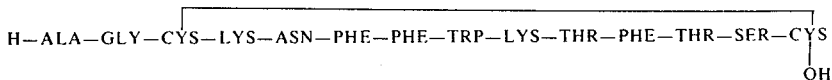

Our improved process may be applied to the synthesis of human calcitonin in a similar manner to that described in connection with salmon calcitonin. Human calcitonin includes 32 amino acids in its amino acid chain. Starting with proline, this amino acid at position 32 is coupled with a BHA resin, then alanine at position 31, and glycine at position 30 are attached according to the system of protection, coupling and deprotection previously explained, using the reactants, including amino acid groups and protecting groups, as are set forth in Table IV in the sequence indicated. When the cysteine groups are reached at positions 7 and 1, there is used at one of these positions an n-alkylthio protective group and at the other of these positions, the usual BZ group may be used.

When the amino acid chain is completed the peptide may be written (assuming that the n-alkylthio group is added at the 7th position):

$$\text{\textcircled{X}}-\overset{C_6H_5}{\underset{|}{C}}HNH-PRO-\overset{BZ}{\underset{|}{T}}HR-GLY-\overset{BZ}{\underset{|}{S}}ER-GLY-\overset{BZ}{\underset{|}{T}}HR-ASN-\overset{BZ}{\underset{|}{T}}HR-\overset{T}{\underset{|}{A}}RG-PRO-\overset{W}{\underset{|}{T}}\overset{BZ}{\underset{|}{Y}}R-\overset{BZ}{\underset{|}{T}}HR$$

$$GLN-LEU-\overset{V}{\underset{|}{L}}YS-\overset{V}{\underset{|}{H}}IS-LEU-\overset{BZ}{\underset{|}{G}}LU-GLN-\overset{BZ}{\underset{|}{S}}ER-LEU-\overset{V}{\underset{|}{L}}YS-GLY-LEU-VAL-\overset{S-n-alkyl}{\underset{|}{C}}YS$$

$$\overset{BZ}{\underset{|}{T}}HR-\overset{BZ}{\underset{|}{S}}ER-LEU-ASN-\overset{BZ}{\underset{|}{S}}ER-\overset{BZ}{\underset{|}{C}}YS-H$$

After treatment with acid to remove the resin the peptide becomes:

$$H-CYS-SER-ASN-LEU-SER-THR-\overset{S-n-alkyl}{\underset{|}{C}}YS-VAL-LEU-GLY-LSY-LEU-SER-GLN-$$
$$-GLU-LEU-HIS-LYS-LEU-GLN-THR-TYR-PRO-ARG-THR-ASN-THR-GLY-$$
$$-SER-GLY-THR-PRO-NH_2$$

After this peptide has been allowed to rearrange under conditions as described herein for completing the disulfide ring, it may be written:

$$H-CYS-GLY-ASN-LEU-SER-THR-CYS-MET-LEU-GLY-THR-TYR-THR-$$
$$-GLN-ASP-PHE-ASN-LYS-PHE-HIS-THR-PHE-PRO-GLN-THR-ALA-$$
$$-ILE-GLY-VAL-GLY-ALA-PRO-NH_2$$

which is the structure of human calcitonin.

A specific example of the synthesis of human calcitonin using our improved process is given in Example B.

EXAMPLE B

Synthesis of Human Calcitonin

Resin Activation

The benzhydrylamine (BHA) resin (4 g) with an amine titer of 0.55 meq/g was placed in the reactor vessel of a peptide synthesizer marketed by Schwartz-Mann, Inc. of Orangeburg, New York. The resin was treated with 20 ml of the following solvents filtering after each treatment:
Methylene chloride - 2 minutes
Chloroform - 2 minutes 2 times each
10% Triethylamine in chloroform - 5 minutes 2 times each
Chloroform - 2 minutes
Methylene chloride - 2 minutes 3 times each

Cycle 32

Coupling:

The BHA resin, 20 ml of methylene chloride and 0.95 g (0.0044 mole) of BOC-L-proline were agitated for 10 minutes. 4.4 ml of a methylene chloride solution of dicyclohexylcarbodiimide (1 milliequivalent of DCCI per 1 ml of solution) was added to the reactor and the mixture agitated for 6 hours. The reaction mixture was removed from the reactor by filtration and the BOC-prolyl BHA resin subjected to the following successive 2 minute, 20 ml washes, removing the wash by filtration each time:
Methylene chloride - 2 times
Methyl alcohol - 2 times
Methylene chloride - 2 times

Acetylation:

The resin was then agitated with a mixture of 1.5 ml of triethylamine (TEA), 1 ml of acetic anhydride and 20 ml of chloroform for 2 hours. The reaction mixture was removed by filtration and the resin subjected to the following 2 minute, 20 ml washes:
Chloroform - 2 times
Methyl alcohol - 2 times
Methylene chloride - 3 times
A ninhydrin test was negative (E. Kaiser, et al, Anal. Biochem., 34 595–8 [1970]).

Deprotection:

The BOC-protected resin was agitated for 5 minutes with a mixture of 12.5 ml of trifluoroacetic acid (TFA) and 12.5 ml of methylene chloride. This mixture was removed by filtration and the resin was agitated with a second mixture of 12.5 ml of TFA and 12.5 ml of methylene chloride for 30 minutes. The reaction mixture was removed by filtration and the resin subjected to the following 20 ml washes:

Methylene chloride - 2 times 2 minutes each
Methyl alcohol - 2 times 2 minutes each
Chloroform - 2 times 2 minutes each
10% TEA in chloroform - 2 times 10 minutes each
Chloroform - 2 times 2 minutes each
Methylene chloride - 2 times 2 minutes each The L-proline BHA resin was titrated to establish the amine or proline titer. This value was 0.494 milliequivalents of amine or proline per gram of resin.

Cycle 31

Coupling:

The L-prolyl resin, 20 ml of methylene chloride and 0.83 g (0.0044 mole) of BOC-alanine were agitated for 10 minutes. Then 4.4 ml of a methylene chloride solution of dicyclohexylcarbodiimide (1 milliequivalent of DCCI per 1 ml of solution or a total of 0.0044 mole of DCCI) was added to the reactor and the mixture agitated for 2 hours. The reaction mixture was removed from the reactor by filtration and the BOC-L-alanyl-L-prolyl BHA resin subjected to the following successive 2 minute, 20 ml washes, removing the wash by filtration each time:
Methylene chloride - 2 times
Methyl alcohol - 2 times
Methylene chloride - 3 times
A ninhydrin test was negative.

Cycles 30 through 26

The coupling and deprotection procedures used in these cycles were the same as in Cycle 31 except that the following amino acid derivatives were used in place of the alanine derivative:
Cycle 30 - 0.77 g (0.0044 mole) of BOC-glycine
Cycle 29 - 0.95 g (0.0044 mole) of BOC-L-valine
Cycle 28 - The material used was the same as Cycle 30
Cycle 27 - 1.02 g (0.0044 mole) of BOC-L-isoleucine
Cycle 26 - The material used was the same as Cycle 31

Cycle 25

Coupling:

The peptide resin obtained from Cycle 26 was washed twice with 20 ml portions of dimethylformamide (DMF). The resin peptide was then agitated for 10 minutes with a mixture of 2.04 g (0.0066 mole) of BOC-O-benzyl-L-threonine and 20 ml of DMF. Then 6.6 ml of DCCI in methylene chloride (equivalent to 0.0066 mole of DCCI) was added and the mixture agitated for 6 hours. The reaction mixture was removed by filtration. The resin peptide was subjected to 2 minute washes with two successive 20 ml portions of the following solvents: DMF, methylene chloride, methyl alcohol, methylene chloride. The ninhydrin test was negative.

Deprotection:

Repeat deprotection procedure used in Cycle 32.

Cycle 24

Coupling:

The peptide resin obtained from Cycle 25 was washed twice with 20 ml portions of DMF. The resin was then agitated for 24 hours with a solution of 2.42 g (0.0066 mole) of BOC-L-glutamine-p-nitrophenyl ester in 25 ml of DMF. The reaction mixture was filtered and the resin peptide subjected to 2 minute washes with two successive 20 ml portions of the following solvents: DMF, methylene chloride, methanol, methylene chloride. Each individual solvent was removed by filtration. A ninhydrin test was negative.

Deprotection:

The deprotection procedure used in Cycle 32 was repeated.

Cycle 23

Coupling:

The peptide resin obtained from Cycle 24 was agitated for 10 minutes with 1.42 g (0.0066 mole) of BOC-L-proline and 20 ml of methylene chloride. 6.6 ml of DCCI in methylene chloride (equivalent to 0.0066 mole of DCCI) was added and the mixture agitated for 16 hours. The reaction mixture was removed by filtration and the resin peptide was subjected to 2 minute washes with two successive 20 ml portions of the following solvents: methylene chloride, methyl alcohol, methylene chloride. Each individual wash was removed by filtration. The ninhydrin test was negative.

Deprotection:

The deprotection procedure used in Cycle 32 was repeated.

Cycle 22

The coupling and deprotection procedures used in this cycle were the same as in Cycle 23 except that in the coupling reaction, 1.75 g (0.0066 mole) of BOC-L-phenylalanine was used in place of BOC-L-proline.

Cycles 21 through 18

The coupling and deprotection procedures used in these cycles were the same as in Cycle 31 except that the following amino acid derivatives were used in place of the alanine derivative:
Cycle 21 - 1.36 g (0.0044 mole) of BOC-O-benzyl-L-threonine
Cycle 20 - 1.71 g (0.0044 mole) of BOC-N(im)carbobenzyloxy-L-histidine
Cycle 19 - 1.17 g (0.0044 mole) of BOC-L-phenylalanine
Cycle 18 - 1.67 g (0.0044 mole) of BOC-$\epsilon$-carbobenzyloxy-L-lysine

Cycle 17

The coupling and deprotection procedure used in this cycle were the same as in Cycle 24 except that 2.33 g (0.0066 mole) of BOC-L-asparagine-p-nitrophenyl ester was used in place of the glutamine derivative.

Cycles 16 and 15

The coupling and deprotection procedures used in these cycles were the same as in Cycle 31 except that the following amino acid derivatives were used in place of the alanine derivative:
Cycle 16 - 1.17 g (0.0044 mole) of BOC-L-phenylalanine
Cycle 15 - 1.42 g (0.0044 mole) of BOC-L-aspartic acid-$\beta$-benzyl ester

Cycle 14

Same as Cycle 24.

Cycle 13

Same as Cycle 21.

Cycle 12

The coupling and deprotection procedure used in this cycle was the same as in Cycle 25 except that 2.45 g (0.0066 mole) of BOC-O-benzyl-L-tyrosine was used in place of the threonine derivative and the agitation time was extended to 16 hours.

Cycle 11

Same as Cycle 25.

Cycles 10 through 7

The coupling and deprotection procedures used in these cycles were the same as in Cycle 31 except that in the coupling reaction the following amino derivatives were used in place of the BOC-L-alanine:
Cycle 10 - 0.77 g (0.0044 mole) of BOC-glycine
Cycle 9 - 1.02 g (0.0044 mole) of BOC-L-leucine
Cycle 8 - 1.1 g (0.0044 mole) of BOC-L-methionine
Cycle 7 - 1.24 g (0.0044 mole) of BOC-S-ethylthio-L-cysteine

Cycle 6

Same as Cycle 25.

Cycles 5 and 4

The coupling and deprotection procedures used in these cycles were the same as in Cycle 31 except that in the coupling reaction the following amine derivatives were used in place of the BOC-L-alanine:
Cycle 5 - 1.3 g (0.0044 mole) of BOC-O-benzyl-L-serine
Cycle 4 - 1.02 g (0.0044 mole) of BOC-L-leucine

Cycle 3

Same as Cycle 17.

Cycles 2 and 1

The coupling and deprotection procedures used in these cycles were the same as in Cycle 31 except that in the coupling reaction the following amino acid derivatives were used in place of the BOC-L-alanine:
Cycle 2 - 0.77 g (0.0044 mole) of BOC-glycine
Cycle 1 - 1.5 g (0.0044 mole) of BOC-S-p-methoxy-benzyl-L-cysteine After completion of Cycle 1 the resin peptide was washed with two successive 20 ml portions of n-hexane. The peptide material was removed from the reactor and dried in an electric vacuum oven at 40°C and 0.1 mm of Hg. for 24 hours. The blocked human calcitonin peptide resin weighed 11 g.

Cleavage with Hydrogen Fluoride

The dried resin peptide (2 g) and 2 ml of anisole were placed in a Teflon reaction vessel. The vessel equipped with a Teflon-coated magnetic stirrer was placed in a dry-ice acetone bath and 15 ml of hydrogen fluoride gas was condensed into the vessel. This mixture was stirred at 0°C in an ice bath for 1 hour. The hydrogen fluoride was removed by evaporation at reduced pressure. The residue was triturated with 4 × 25 ml portions of ethyl acetate. The peptide was extracted from the resin beads with 2 × 50 ml of glacial acetic acid. The extract was lyophilized to give 1063 mg of cleaved peptide.

Cyclization of Peptide to Human Calcitonin

The crude peptide 1000 mg was dissolved in 250 ml of oxygen-free distilled water with 1 ml of glacial acetic acid added. The pH of the solution was adjusted to 7.5 by the addition of concentrated ammonium hydroxide. This mixture was stirred in a closed vessel under a stream of nitrogen for 24 hours. At this time, no ethyl mercaptan could be detected in the emerging nitrogen stream. The ethyl mercaptan content of the nitrogen stream was measured by passing the stream through a solution of Ellman's reagent (Ellman, G. L., Arch. Biochem. Biophys., 82, 70–7 (1959)). The pH of the reaction mixture was adjusted to 3.2 by the addition of glacial acetic acid. Lyophilization gave a solid product which weighed 985 mg.

Purification of the Crude Human Calcitonin

The solid product was dissolved in 0.5N acetic acid and purified by passing through a Sephadex G-25 (fine) gel-filtration column and eluted with 0.5N acetic acid. The human calcitonin fraction from this column was collected and lyophilized to give a white fluffy solid.

This white fluffy solid was dissolved in 0.05 M aqueous ammonium acetate (pH 5). The solution was adjusted to pH 5 and purified by ion-exchange chromatography using a SP-Sephadex C-25 column eluted with ammonium acetate buffer. The human calcitonin fraction was collected and lyophilized twice to give a fluffy white solid. This material was found to be biologically and chemically equivalent to the product reported in the literature (Sieber, P., et al, Helv. Chim. Acta 53 2135-50 [1970]). The amino acid analysis (acid hydrolysis) gave the following ratios of amino acids (the theoretical result is given in parenthesis): LYS 1.02 (1), HIS 0.99 (1), ASP 3.28 (3), THR 5.21 (5), SER 0.74 (1), GLU 1.95 (2), GLY 4.33 (4), ALA 2.03 (2), VAL 1.04 (1), MET 0.86 (1), ILE 1.07 (1), LEU 2.24 (2), TYN 0.7 (1), PHE 3.0 (3). The values for PRO and CYS were not determined. The biological activity was found to be 100 MRC units per mg.

Likewise, our improved process may be applied in the synthesis of vasopressin using as the reactants at the 9th position in the amino acid chain the groups set forth in Table V or equivalent thereof. The formula of the peptide resulting from the reactions referred to in Table V and before cleavage of the resin, may be written:

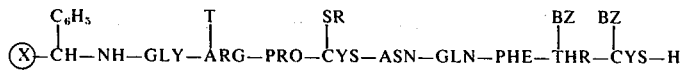

After acid treatment of this peptide to cleave the resin and most of the protective groups, the formula becomes:

which is percursor of vasopressin.

After subjecting this peptide to our improved cyclizing method as herein described the peptide becomes:

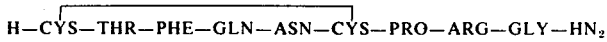

which is vasopressin.

To apply our improved process in the synthesis of somatostatin, the amino acid chain for somatostatin may be built using the reactants set forth in Table VI or equivalents thereof. The formula of the peptide resulting from the reaction illustrated in Table VI and before cleavage of the resin, may be written:

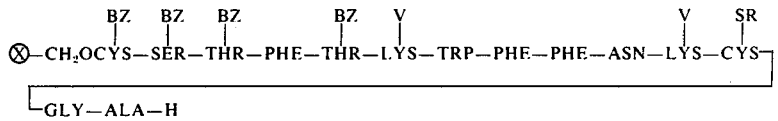

After acid treatment of this peptide to cleave the resin and most of the protective groups, the formula becomes:

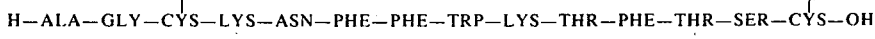

After subjecting this peptide to our improved cyclizing method as herein described, the peptide becomes:

H—ALA—GLY—CYS—LYS—ASN—PHE—PHE—TRP—LYS—THR—PHE—THR—SER—CYS—OH which is somatostatin.

To apply the improved process in the synthesis of porcine calcitonin, the amino acid chain for porcine calcitonin may be built using the reactants set forth in Table VII or equivalents thereof. The formula of the peptide resulting from the reactions illustrated in Table VII and before cleavage of the resin, may be written:

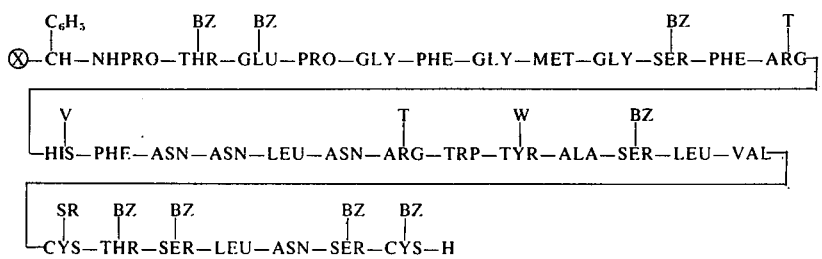

After acid treatment of this peptide to cleave the resin and most of the protective groups, the formula becomes:

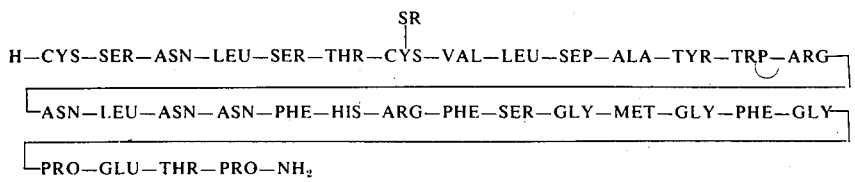

which is a precursor of porcine calcitonin.

After subjecting this peptide to our improved cyclizing method as herein described, the peptide becomes:

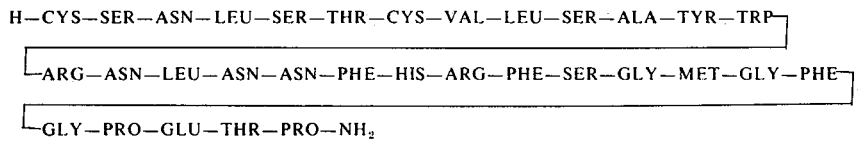

which is porcine calcitonin.

To apply the improved process in the synthesis of bovine calcitonin the amino acid chain for bovine calcitonin may be built using the reactants set forth in Table VIII or equivalents thereof. The formula of the peptide resulting from the reactions illustrated in Table VIII and before cleavage of the resin, may be written:

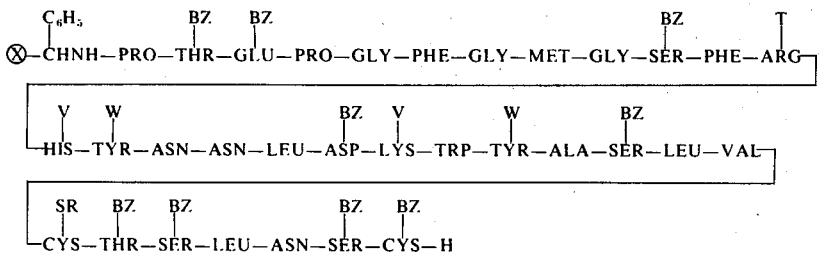

After acid treatment of this peptide to cleave the resin and most of the protective groups, the formula becomes:

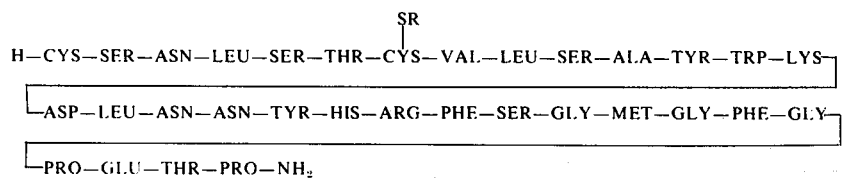

which is a precursor of bovine calcitonin.

After subjecting this peptide to our improved cyclizing method as herein described, the peptide becomes:

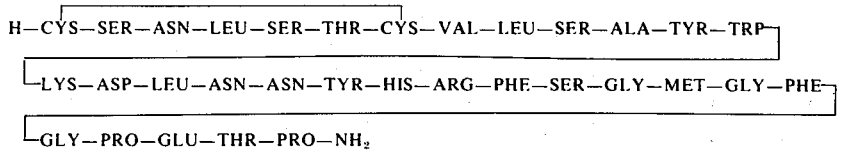

which is bovine calcitonin.

While the invention has been specifically described and demonstrated with respect to specific peptides, it will be apparent to those skilled in this art that the invention is applicable to numerous specific peptide structures, and that the invention may be varied and changed in many ways all within the spirit of the invention and within the scope of the appended claims.

We claim:

1. In a process for preparing a peptide having a disulfide ring structure, the step of holding a peptide which contains at least two cysteine moieties in its amino acid chain one of which contains a free sulfhydryl function and the other having its sulfhydryl function protected by an n-alkylthio group which participates in a disulfide bond with the thiol function of said other moiety in a solution substantially free of oxygen until rearrangement has taken place to yield the cyclic disulfide peptide.

2. A process as set forth in claim 1 in which said solution is an aqueous solution.

3. A process as set forth in claim 1 in which said solution is an aqueous alcoholic solution.

4. A process as set forth in claim 1 in which said alkyl group in said n-alkylthio group is ethyl, methyl, propyl or butyl.

5. A process as set forth in claim 4 in which said alkyl group is ethyl.

6. A process as set forth in claim 1 which includes the step of agitating said solution during said rearrangement.

7. A process as set forth in claim 1 including conducting said rearrangement under a stream of inert gas.

8. A process as set forth in claim 7 wherein said gas is nitrogen.

9. A process as set forth in claim 7 which includes continuing the process until the gas which has passed over said solution has become substantially free of mercaptan.

10. A process as set forth in claim 1 in which said peptide is
H-CYS-THR-ILE-GLN-ASN-CYS-PRO-LEU-GLY-NH$_2$
in which one of the CYS groups contained therein has bonded thereto the group —S—n—alkyl.

11. A process as set forth in claim 1 in which said peptide is

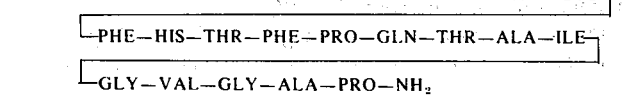

in which one of the CYS groups contained therein has bonded thereto the group —S—n—alkyl.

12. A process as set forth in claim 1 in which said peptide is H-ALA-GLY-CYS-LYS-ASN-PHE-PHE-TRP-LYS-THR-PHE-THR-SER-CYS-OH
in which one of the CYS groups contained therein has bonded thereto the group —S—n—alkyl.

13. A process as set forth in claim 1 in which said peptide is
H-CYS-TYR-PHE-GLN-ASN-CYS-PRO-ARG-GLY-NH₂
in which one of the CYS groups contained therein has bonded thereto the group —S—n—alkyl.

14. A process as set forth in claim 1 in which said peptide is

H—CYS—SER—ASN—LEU—SER—THR—CYS—VAL—LEU—
└GLY—LYS—LEU—SER—GLN—GLU—LEU—HIS—LYS—
└LEU—GLN—THR—TYR—PRO—ARG—THR—ASN—THR—
└GLY—SER—GLY—THR—PRO—NH₂ in which one of the CYS groups contained therein has bonded thereto the group —S—n—alkyl.

15. A process as set forth in claim 1 in which said peptide is

H—CYS—SER—ASN—LEU—SER—THR—CYS—VAL—LEU—
└SER—ALA—TYR—TRP—ARG—ASN—LEU—ASN—ASN—
└PHE—HIS—ARG—PHE—SER—GLY—MET—GLY—PHE—
└GLY—PRO—GLU—THR—PRO—NH₂ in which one of the CYS groups contained therein has bonded thereto the group —S—n—alkyl.

16. A process as set forth in claim 1 in which said peptide is

H—CYS—SER—ASN—LEU—SER—THR—CYS—VAL—LEU—
└SER—ALA—TYR—TRP—LYS—ASP—LEU—ASN—ASN—
└TYR—HIS—ARG—PHE—SER—GLY—MET—GLY—PHE—
└GLY—PRO—GLU—THR—PRO—NH₂ in which one of the CYS groups contained therein has bonded thereto the group —S—n—alkyl.

17. A process as set forth in claim 1 in which said peptide is

H—ALA—GLY—CYS—LYS—ASN—PHE—PHE—TRP—LYS—
└THR—PHE—THR—SER—CYS
                    \
                     OH in which one of the CYS groups contained therein has bonded thereto the group —S—n—alkyl.

18. A process as set forth in claim 1 in which said peptide is held in said solution at a pH of from 5 to 10.

19. A process as set forth in claim 17 in which said peptide is held in said solution at a pH of from 6.0 to 8.5.

20. A process as set forth in claim 18 in which said peptide is held in said solution at a pH of about 7.5.

21. A process as set forth in claim 1 which includes the steps of coupling one cysteine moiety into an amino acid chain while protecting the sulfhydryl function of said one moiety with a BZ group selected from the class consisting of benzyl, 4-methoxybenzyl, 4-methylbenzyl, 3,4-dimethylbenzyl, 4-chlorobenzyl, 2,6-dichlorobenzyl, 4-nitrobenzyl and benzylhydryl, and coupling another cysteine moiety into said chain while protecting the sulfhydryl function of said other moiety with an n-alkylthio group, and treating the peptide so formed with anhydrous acid to cleave said BZ group while leaving said n-alkylthio group attached.

22. A process as set forth in claim 21 in which said chain includes the following sequence of amino acid moieties:
CYS-TYR-ILE-GLN-ASN-CYS-PRO-LEU-GLY 23. A process as set forth in claim 21 in which said chain includes the following sequence of amino acid moieties:

CYS—GLY—ASN—LEU—SER—THR—CYS—MET—LEU—
└GLY—THR—TYR—THR—GLN—ASP—PHE—ASN—LYS—
└PHE—HIS—THR—PHE—PRO—GLN—THR—ALA—ILE—
└GLY—VAL—GLY—ALA—PRO

24. A process as set forth in claim 21 in which said chain includes the following sequence of amino acid moieties:
ALA-GLY-CYS-LYS-ASN-PHE-PHE-TRP-LYS-THR-PHE-THR-SER-CYS 25. A process as set forth in claim 21 in which the alkyl group of said n-alkylthio group is ethyl, methyl, propyl or butyl.

26. A process as set forth in claim 25 in which said alkyl group is ethyl.

27. A peptide having an amino acid chain containing two cysteine moieties one of which has a free sulfhydryl function and the other of which has its sulfhydryl function protected by an n-alkylthio group.

28. A peptide as set forth in claim 27 in which said amino acid chain is the same as in oxytocin.

29. A peptide as set forth in claim 27 in which said amino acid chain is the same as in vasopressin.

30. A peptide as set forth in claim 27 in which said amino acid is the same as in human calcitonin.

31. A peptide as set forth in claim 27 in which said amino acid chain is the same as in porcine calcitonin.

32. A peptide as set forth in claim 27 in which said amino acid chain is the same as in bovine calcitonin.

33. A peptide as set forth in claim 27 in which said amino acid chain is the same as in somatostatin.

34. A peptide as set forth in claim 27 and in which a cysteine moiety in the 1st position in its amino acid chain has a free sulfhydryl function and a cysteine moiety in the 6th position in its amino acid chain has its sulfhydryl function protected by an n-alkylthio group.

35. A peptide as set forth in claim 27 and in which a cysteine moiety in the 6th position in its amino acid chain has a free sulfhydryl function and a cysteine moiety in the 1st position in its amino acid chain has its sulfhydryl function protected by an n-alkylthio group.

36. A peptide as set forth in claim 27 in which a cysteine moiety in the 1st position of its amino acid chain has a free sulfhydryl function and a cysteine moiety in the 7th position in its amino acid chain has its sulfhydryl function protected by an n-alkylthio group.

37. A peptide as set forth in claim 27 in which a cysteine moiety in the 7th position of its amino acid chain has a free sulfhydryl function and a cysteine moiety in the 1st position in its amino acid has its sulfhydryl function protected by an n-alkylthio group.

38. A peptide having an amino acid chain containing two cysteine moieties one of which has it sulfhydryl function protected by an n-alkylthio group and the other having its sulfhydryl function protected by a group selected from the class consisting of benzyl, 4-methoxybenzyl, 3,4-dimethylbenzyl, 4-chlorobenzyl, 2,6-dichlorobenzyl, 4-nitrobenzyl and benzylhydryl.

* * * * *

UNITED STATES PATENT OFFICE
CERTIFICATE OF CORRECTION

Patent No. 3,929,758                           Dated December 30, 1975

Inventor(s)     John Lawrence Hughes et al.     Page 1 of 2

It is certified that error appears in the above-identified patent and that said Letters Patent are hereby corrected as shown below:

Column 4, line 12, "histine" should read -- histidine --.

Column 6, line 20, "BOC-O-benzyl-L-tyrosine" at Position No. 11 in Table IV, should read -- BOC-O-benzyl-L-threonine --.

Column 7, line 35, "BOC-O-benzyl-L-threonine" at Position No. 10 in Table VII, should read -- BOC-O-benzyl-serine --.

Column 8, line 7, "BOC-L-typtophan" at Position No. 13 in Table VIII, should read -- BOC-L-tryptophan --.

Column 16, line 1, "Thr" should read -- The --. Column 17, beginning at line 10, the formula should appear as shown below:

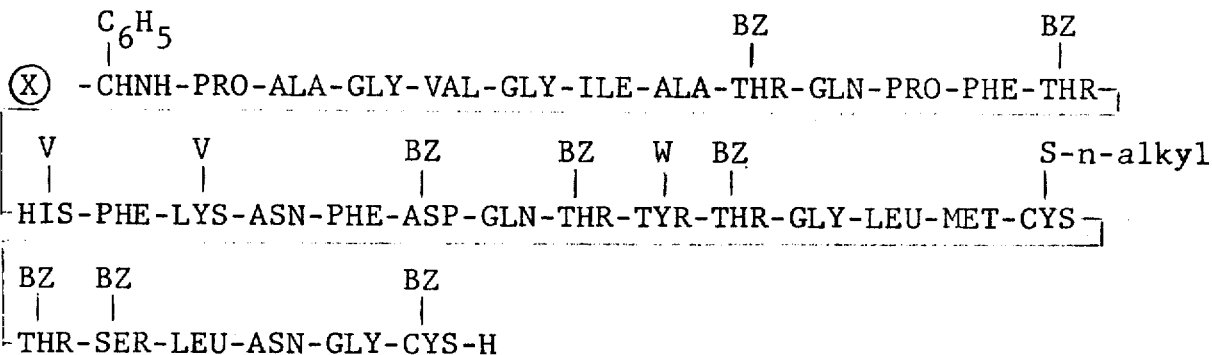

UNITED STATES PATENT OFFICE
CERTIFICATE OF CORRECTION

Patent No. 3,929,758  Dated December 30, 1975

Inventor(s) John Lawrence Hughes et al.    Page 2 of 2

It is certified that error appears in the above-identified patent and that said Letters Patent are hereby corrected as shown below:

Column 17, beginning at about line 27, the formula should appear as shown below:

```
                          S-n-alkyl
                             |
H-CYS-GLY-ASN-LEU-SER-THR-CYS-MET-LEU-GLY-THR-TYR-THR-GLN┐

└ASP-PHE-ASN-LYS-PHE-HIS-THR-PHE-PRO-GLN-THR-ALA-ILE-GLY-VAL┐

└GLY-ALA-PRO-NH₂
```

Column 17, beginning at about line 40, the formula should appear as shown below:

```
  ┌─────────────────────────────────┐
  |                                 |
H-CYS-GLY-ASN-LEU-SER-THR-CYS-MET-LEU-GLY-THR-TYR-THR┐

└GLN-ASP-PHE-ASN-LYS-PHE-HIS-THR-PHE-PRO-GLN-THR-ALA┐

└ILE-GLY-VAL-GLY-ALA-PRO-NH₂
```

Signed and Sealed this

Tenth Day of August 1976

[SEAL]

Attest:

RUTH C. MASON  
*Attesting Officer*

C. MARSHALL DANN  
*Commissioner of Patents and Trademarks*